United States Patent
Ebbenga

(10) Patent No.: US 8,322,692 B2
(45) Date of Patent: *Dec. 4, 2012

(54) DEVICE FOR WINCHING

(76) Inventor: Mark Ebbenga, Forest Lake, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/977,953

(22) Filed: Dec. 23, 2010

(65) Prior Publication Data

US 2011/0286830 A1 Nov. 24, 2011

Related U.S. Application Data

(60) Continuation of application No. 12/611,343, filed on Nov. 3, 2009, now Pat. No. 7,866,632, which is a continuation of application No. 12/199,222, filed on Aug. 27, 2008, now Pat. No. 7,621,506, which is a division of application No. 11/700,642, filed on Jan. 31, 2007, now Pat. No. 7,422,407, which is a division of application No. 10/878,073, filed on Jun. 28, 2004, now Pat. No. 7,179,041.

(51) Int. Cl.
*B66D 1/26* (2006.01)

(52) U.S. Cl. ......... 254/278; 254/286; 254/323; 254/338

(58) Field of Classification Search .................. 254/278, 254/286, 323, 338, 279; 414/494; 280/414.1

See application file for complete search history.

(56) References Cited

U.S. PATENT DOCUMENTS

| | | | |
|---|---|---|---|
| 529,026 A | 11/1894 | Fox | |
| 700,319 A | 5/1902 | Fowler | |
| 1,346,152 A | 7/1920 | Amos et al. | |
| 2,411,382 A | 11/1946 | Martin | |
| 2,571,361 A | 10/1951 | Harmanson | |
| 2,744,483 A | 5/1956 | Rhindress | |
| 3,263,845 A | 8/1966 | Davidson | |
| 3,336,896 A | 8/1967 | Burnett | |
| 3,682,335 A | 8/1972 | Smyth | |
| 3,763,816 A | 10/1973 | Wilson, Jr. | |
| 4,575,050 A | 3/1986 | Bechmann | |
| 4,986,915 A | 1/1991 | Meurer | |
| 5,013,206 A | 5/1991 | Ernst et al. | |
| 5,092,646 A | 3/1992 | Smallridge | |
| 5,269,642 A | 12/1993 | Zoromski | |
| 5,320,058 A | 6/1994 | Reed | |
| 5,678,805 A | 10/1997 | Moser et al. | |
| 5,853,185 A | 12/1998 | Marshburn et al. | |
| 6,152,425 A | 11/2000 | Boyer | |
| 6,572,082 B1 | 6/2003 | Dixon et al. | |
| 7,318,579 B1 | 1/2008 | Novoa | |
| 7,494,109 B2 | 2/2009 | van Meel et al. | |

*Primary Examiner* — Emmanuel M Marcelo

(74) *Attorney, Agent, or Firm* — Westman, Champlin & Kelly, P.A.; Z. Peter Sawicki

(57) ABSTRACT

An apparatus positions a boat having a clip attached to a bow onto a boat trailer. The apparatus is used with a winch and two guides mounted on the boat trailer. The two guides are positioned a selected distance from the winch toward the rear of the boat trailer and spaced apart from each other. The apparatus includes three line sections windable about a reel of the winch with two of the line sections being windable about the reel in one direction and the third line being wound in an opposite direction. The two lines that are wound on the reel in the same direction extend around the guides while the third line extends between the guides and all of the lines being connected to each other at their distal ends. Forward movement of the boat engages the clip with the lines such that the boat can be winched onto the trailer.

1 Claim, 12 Drawing Sheets

DEVICE FOR WINCHING

CROSS-REFERENCE TO RELATED APPLICATION

The present application is a continuation of and claims priority of U.S. patent application Ser. No. 12/611,343, filed Nov. 3, 2009, now U.S. Pat. No. 7,866,632 which is a continuation of Ser. No. 12/199,222, filed Aug. 27, 2008, now U.S. Pat. No. 7,621,506 which is a divisional of Ser. No. 11/700,642, filed Jan. 31, 2007, now U.S. Pat. No. 7,422,407, which is a divisional of Ser. No. 10/878,073, filed Jun. 28, 2004, now U.S. Pat. No. 7,179,041, the content of which is hereby incorporated by reference in its entirety.

BACKGROUND OF THE INVENTION

The present invention relates to a method and apparatus for securing a boat to a trailer. More particularly, the present invention relates to a method and apparatus where one person can secure a boat to a trailer without having to leave the boat.

Boating, whether with family and friends or by yourself, can be an enjoyable experience. However, at the end of the day, the pilot must maneuver the boat onto the boat trailer, which can be a difficult task.

Especially when boating by oneself, securing the boat onto the trailer can be difficult. The pilot of the boat typically must first secure the boat to a dock, a pier or a pylon and exit the boat and position the trailer into the body of water so that the boat can be guided onto the trailer. After positioning the trailer into the body of water, the pilot then must get back into the boat, unsecure the boat from the dock, the pier or the pylon and proceed to align the boat with the trailer.

After positioning the boat proximate the trailer, the pilot typically must maintain control of the boat while having to exit the boat and enter the body of water to secure a clip attached to a linewound on a winch to an eyelet typically welded to the bow of the boat. This task can be difficult for a number of reasons including extremely cold water causing discomfort to the pilot, wind causing the boat to drift out of alignment with the trailer and even forcing the boat away from the trailer, and waves causing the boat to drift while not secured to the trailer.

Once the pilot of the boat has secured the clip to the eyelet on the bow of the boat, the pilot must then manually operate the winch to draw the boat further onto the trailer while maintaining alignment of the boat. Maintaining alignment of the boat during the process of securing the boat to the trailer may be difficult due to the external forces on the boat such as wind and waves. Not being able to align the boat on the trailer may cause the boat owner significant frustration and delay in attempting to secure the boat to the trailer, and ultimately towing the trailer and the boat from the body of water.

SUMMARY OF THE INVENTION

The present invention includes an apparatus for positioning a boat having a clip attached to a bow. The apparatus is used with a winch and two guides mounted on the boat trailer. The two guides are positioned a selected distance from the winch toward the rear of the boat trailer and spaced apart from each other. The apparatus includes three line sections windable about a reel of the winch with two of the line sections being windable about the reel in one direction and the third line being wound in an opposite direction. The two lines that are wound on the reel in the same direction extend around the guides while the third line extends between the guides and all of the lines being connected to each other at their distal ends. Forward movement of the boat engages the clip with the lines such that the boat can be winched onto the trailer.

DETAILED DESCRIPTION OF THE PREFERRED EMBODIMENTS

Figure 1:
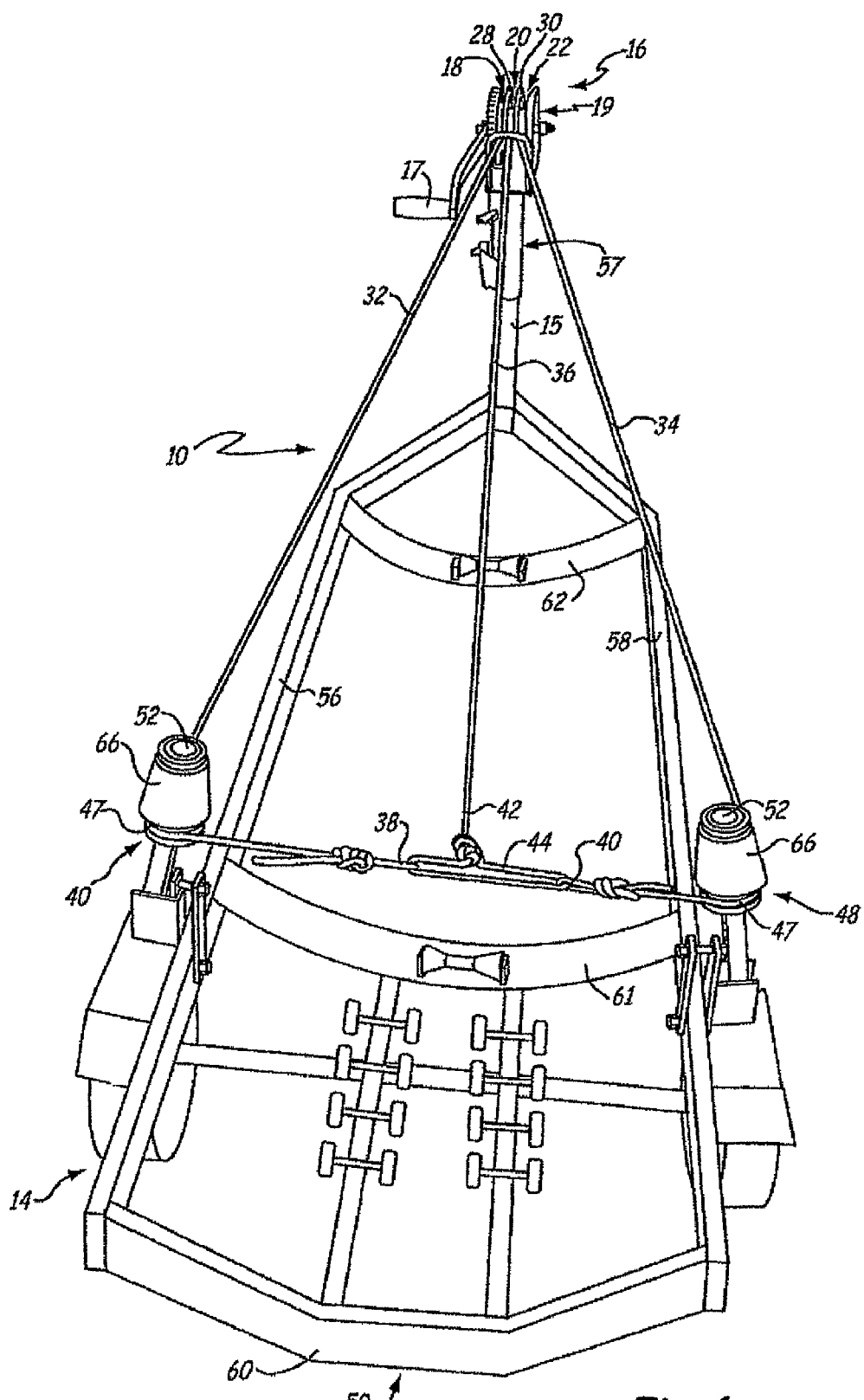
FIG. 1 is a perspective view of a boat trailer having the winch system of the present invention attached thereto in an engaging position.
Figure 6:
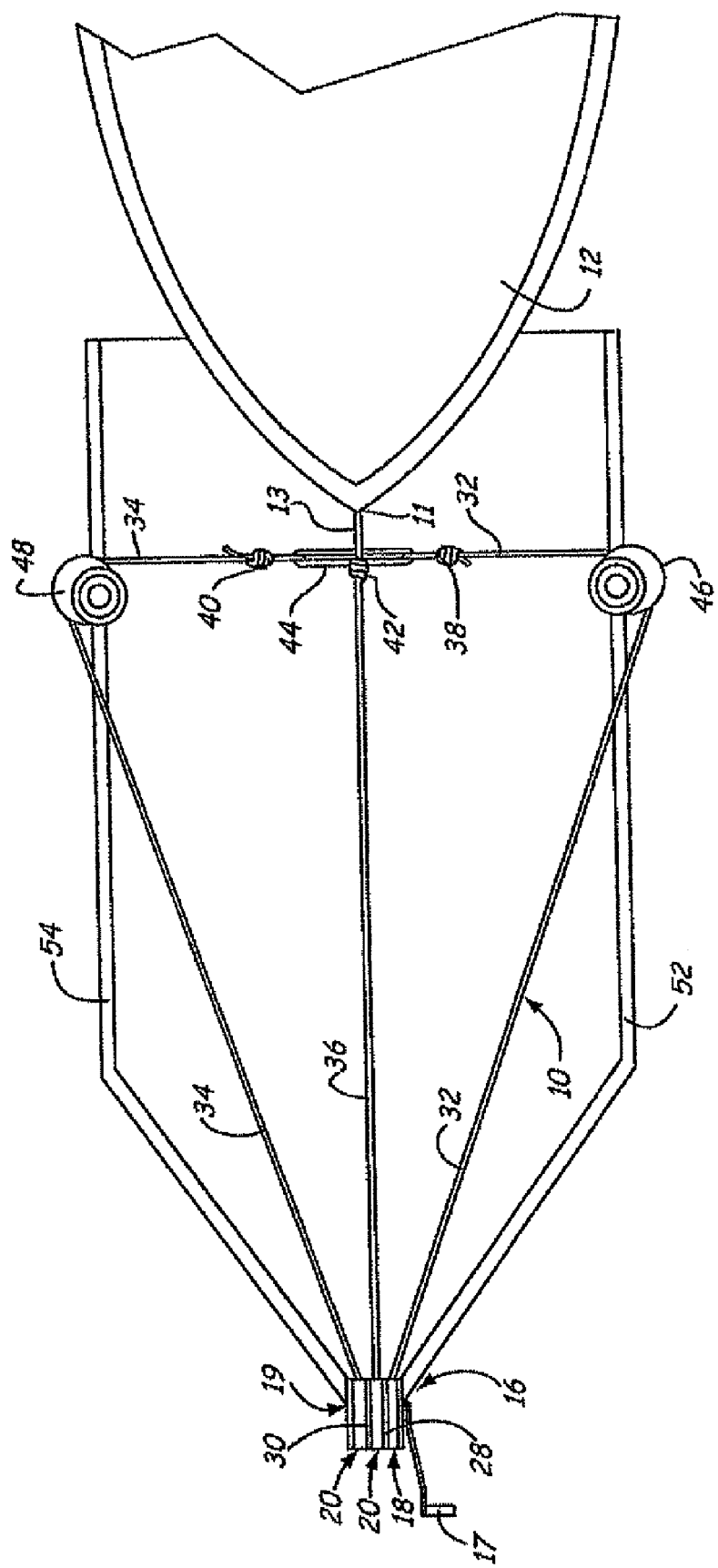
FIG. 6 is a partial top view of the winch system of the present invention having the clip on the boat engaging the distal ends of the lines.
Figure 7:
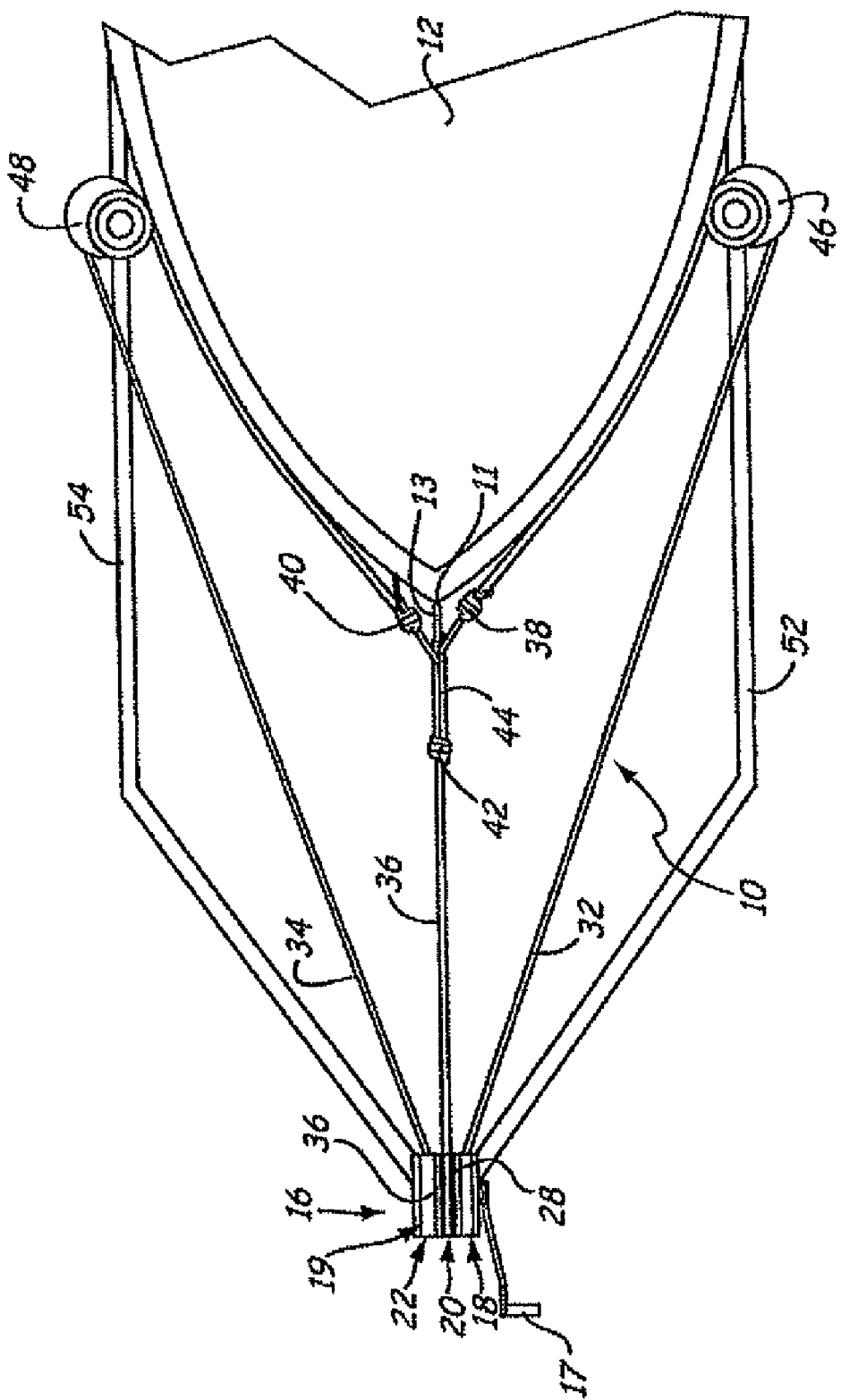
FIG. 7 is a partial top view of the winch system of the present invention having the boat engaging the lines and being propelled onto the trailer.
Figure 8:
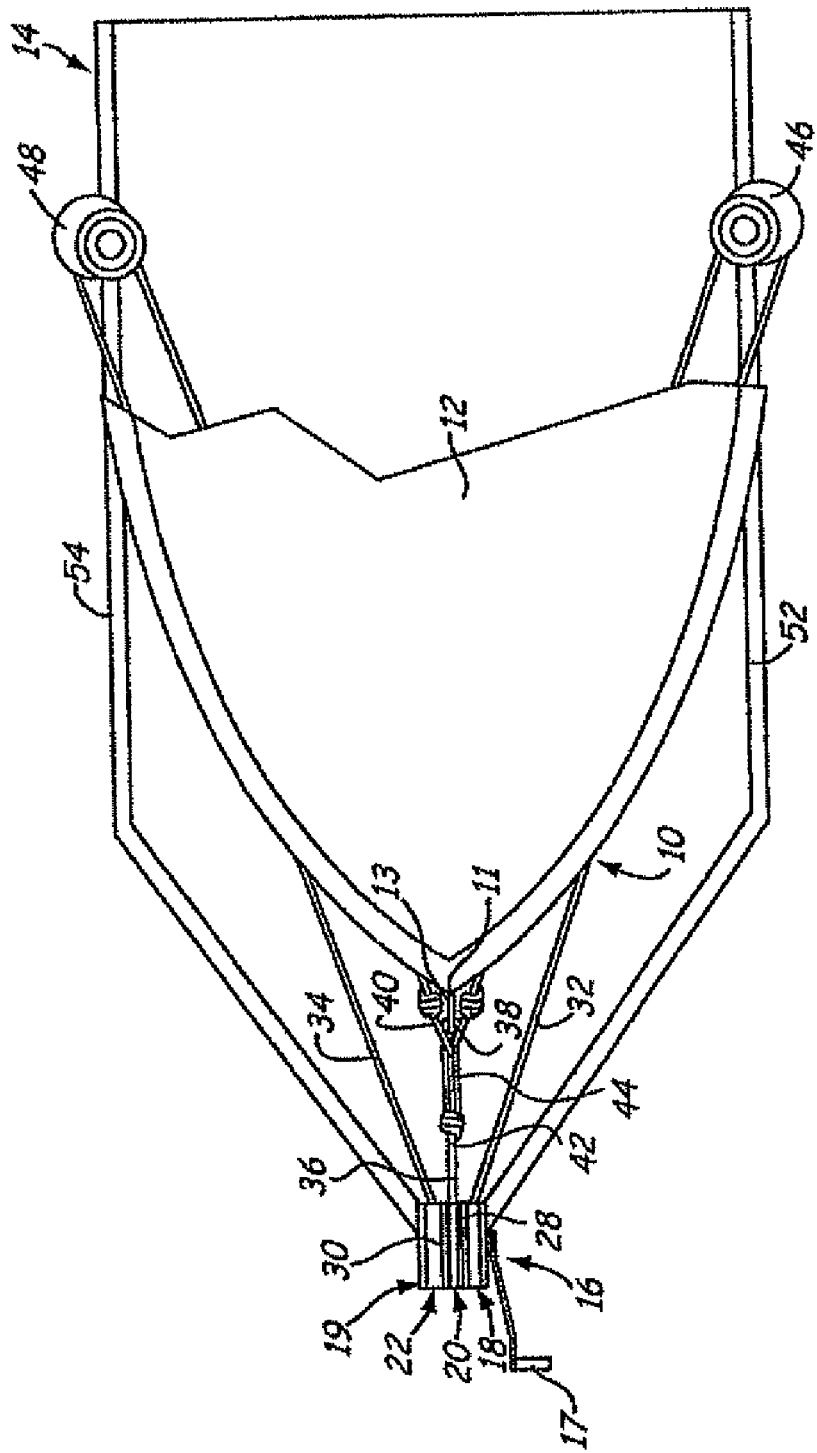
FIG. 8 is a partial top view of the present invention having the boat in a secured position on the trailer.

A winch system of the present invention mounted to a boat trailer is generally, illustrated in FIG. 1 at 10. The winch system 10 allows one person to secure a boat 12 to a trailer 14 without having to exit the boat 12 during the process of positioning the boat 12 on the trailer 14 as best illustrated in FIGS. 6-8.

Referring back to FIGS. 1 and 2, the winch system 10 includes a winch 16 having a reel 19 with at least three partitioned compartments, a left compartment 18, a middle compartment 20 and a right compartment 22 separated by left and right partitions 28 and 30. The winch 16 is mounted to a tongue 15 located at a proximal end 57 of the trailer 14.

Proximal ends of a left line 32 and a right line 34 are coiled about the left compartment 18 and the right compartment 22, respectively, of the winch 16 in a first rotational direction. A middle line 36 is coiled about the middle compartment 20 in a second rotational direction, opposite the first rotational direction. By line is meant either a cable, cord, wire made of natural or synthetic (such as plastic) materials or metal or combination thereof including but not limited to a single filament or strand, braided filaments, strands, or fibers, fibrillated or twisted line, or simply twisted fibers. All that is required of the line is the appropriate tensile strength for the task such as pulling the boat onto the trailer and sufficient limpness of the line to be coiled onto the reel of the winch.

Distal ends 38, 40, and 42 of the left line 32, the right line 34 and the middle line 36, all respectively, are connected to each other such that each of the lines is under tension and not slack. The distal end of the middle line 36 includes a loop 44 onto which smaller loops of the distal ends 38, 40 of the left and right lines 32, 34, respectively, are connected.

Figure 9:
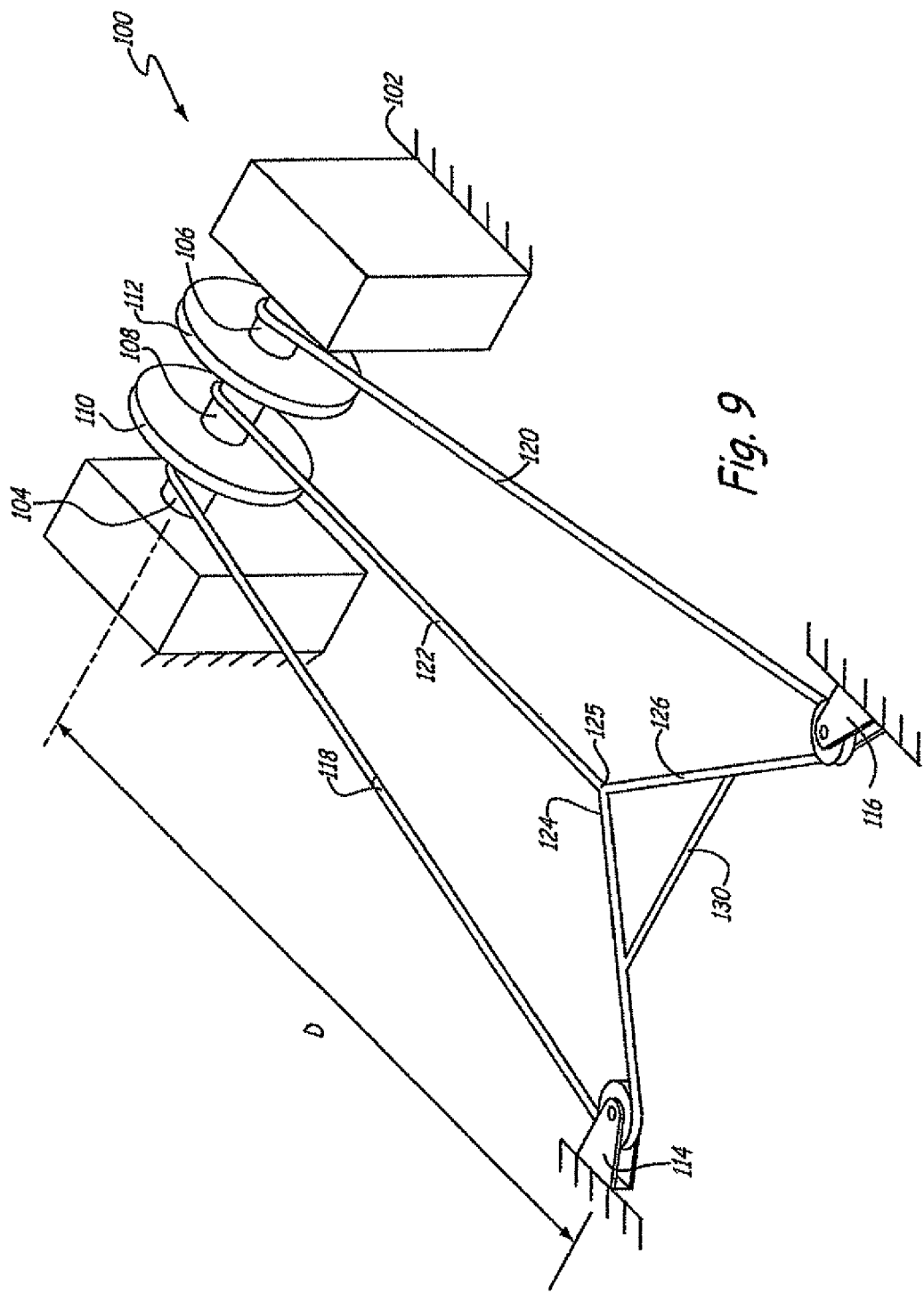
FIG. 9 is a perspective view of the winch system of the present invention.

Alternatively, referring to FIG. 9, the distal ends 124, 126 of the left and right lines 118, 120, respectively, may be fixedly secured to the distal end 128 of the middle line 122 and may include a segment 130 connecting the left and right lines 118, 120. The segment may be constructed of line or a rigid material such as metal or plastic.

Figure 2:
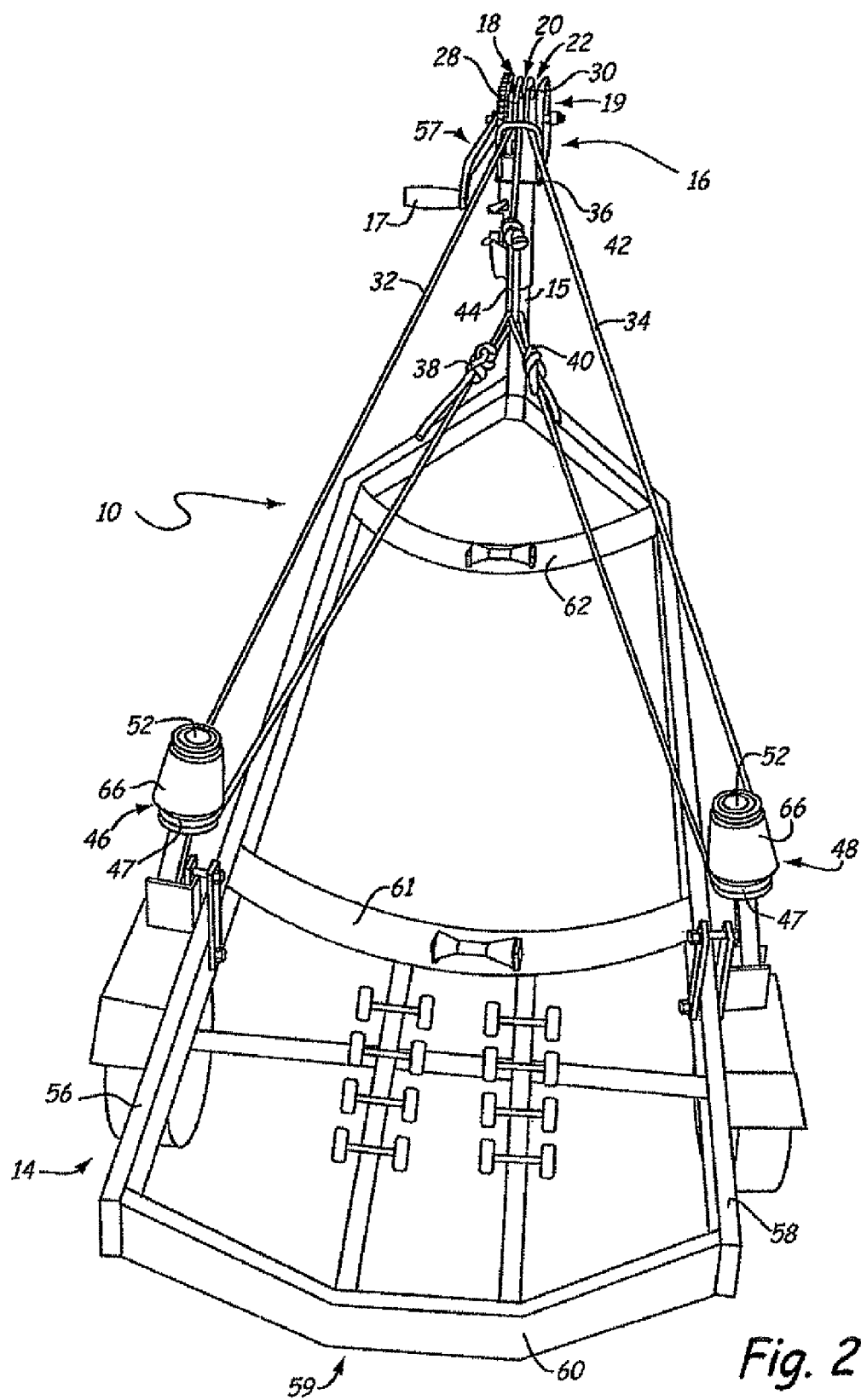
FIG. 2 is a perspective view of a boat trailer having the winch system of the present invention attached thereto in a securing position.

Referring to FIGS. 1 and 2, the left and right lines 32, 34 are guided by left and right guides 46, 48, that are mounted to left and right side members 56, 58 of the trailer 14, respectively. The left and right side members 56, 58 are separated by cross members 60, 61 and 62 to provide strength and stability to the trailer 14. The left and right guides 46, 48 are mirror images of each other and therefore only the right guide 48 will be described in detail.

Figure 3:
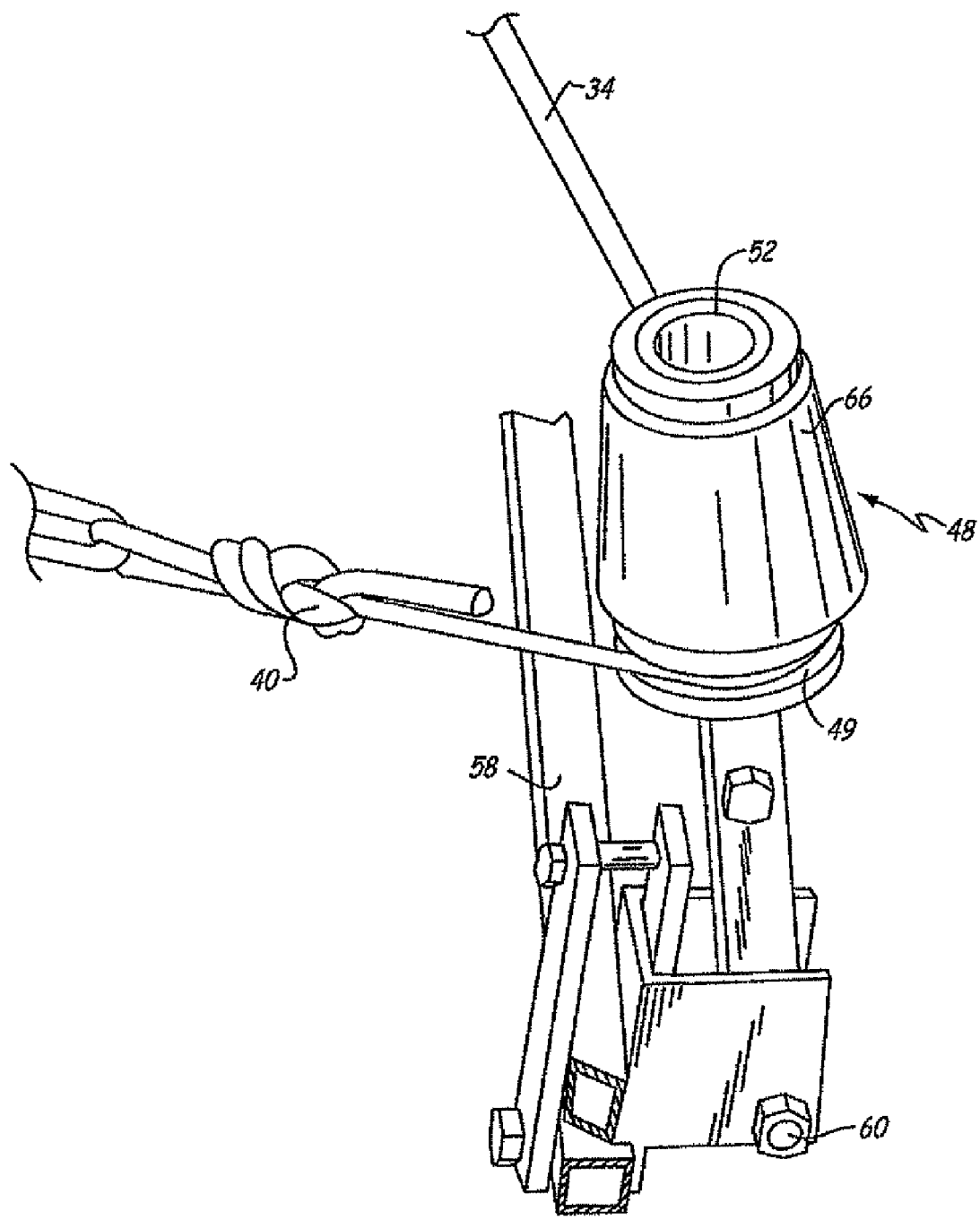
FIG. 3 is a partial perspective view of a guide of the present invention.
Figure 4:
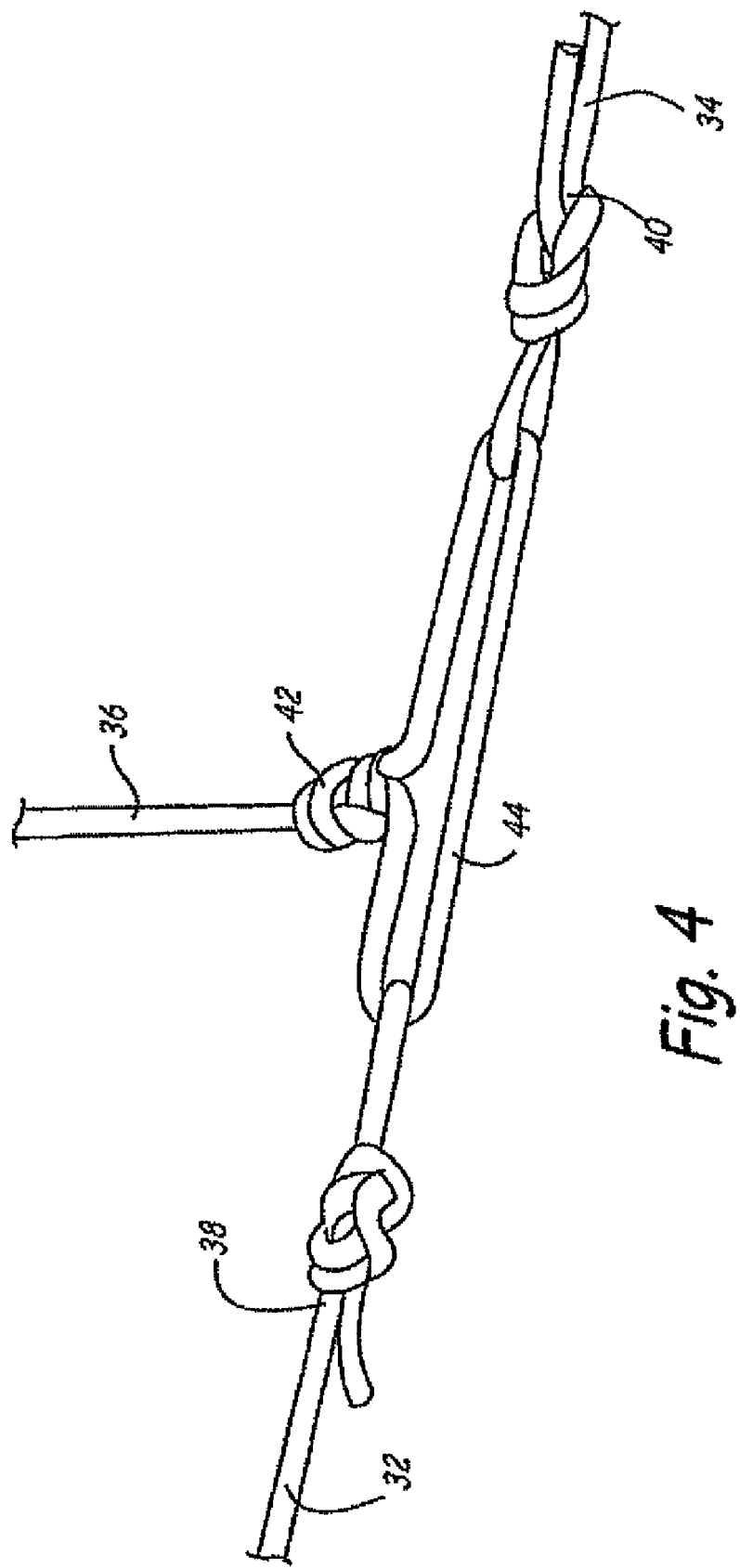
FIG. 4 is a partial perspective view of the distal ends of a left line, a middle line and a right line of the present invention in an engaging position.

Referring to FIG. 3, the guide 48 preferably includes a freely rotatable pulley 47 mounted to an axle 52. The axle 52 is pivotally mounted to the right side member 58 of the trailer 14 with a pivot bolt 60 that allows the pulley 47 to pivot towards and away from the right side member 58. The right guide 48 also preferably includes a bumper 66 which helps in guiding the boat 12 onto the trailer 14 without damaging a hull of the boat 12. Preferably, the bumpers 66 are constructed from a rubber or soft polymeric material which has compressive characteristics. The left guide 46 includes like components having the same reference characters as the components of the right guide 48.

Figure 5:
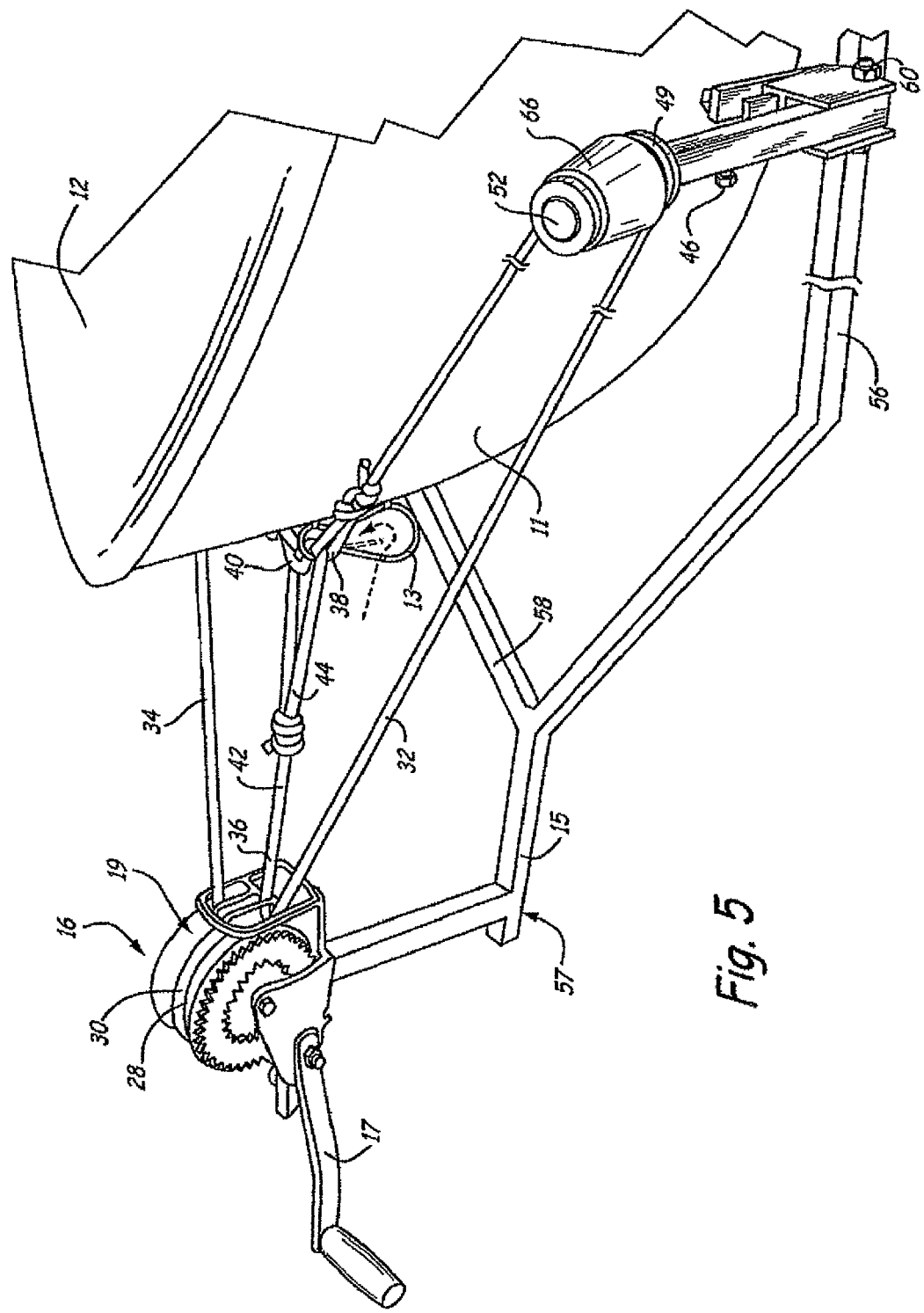
FIG. 5 is a partial perspective view of the present invention having a boat secured to the winch system and positioned proximate the winch.

The winch system 10 is positionable between a first position as best illustrated in FIGS. 1 and 6, wherein the left and right lines 32, 34 and the loop 44 are taut between the left and right guides 46, 48. Referring to FIGS. 5 and 6, a spring biased clip 13 is fixedly attached to a bow 11 of the boat 12. As the boat 12 is piloted over a rearward end 59 of the trailer 14, the clip 13 engages the taut loop 44 between the left and right lines 32, 34. With the clip 13 secured to the loop 44, the boat 12 is secured for reeling onto the trailer 14. The winch 16 preferably is in an unlocked position such that the force of the boat 12 allows the winch 16 to rotate as the boat 12 is propelled towards the winch 16 as illustrated in FIG. 7. As the winch 16 rotates, the length of the middle line 36 decreases while the lengths of the left and right lines 32, 34 increase.

With the bow 11 of the boat 12 proximate the winch 16 as illustrated in FIG. 8, the pilot of the boat 12 can walk to the bow 11 and grab a handle 17 of the winch 16 and rotate the reel 19 such that the boat 12 is brought to a fully forward position on the trailer 14 for further securance. Besides a manual winch 16, the present invention also includes an electric winch and a pneumatic winch either controlled at the winch itself or remotely controlled from a distance away from the winch.

Referring to FIGS. 2 and 8, the winch system 10 is positioned in a second position where the length of the middle line 36 has been minimized while the lengths of the left and right lines 32 and 34 are maximized by the reverse winding of the middle line 36 as compared to the left and right lines 32 and 34 on the compartmentalized reel 19. One skilled in the art will recognize that the operator of the winch 16 can control the distance that the boat is on the trailer between the guides 46, 48 and the winch 16 and any position there between by the winch system 10 of the present invention. The bow 11 of the boat 12 can be maintained in an intermediate position between the second securing position as illustrated in FIG. 2 and the first engaging position illustrated in FIG. 1 by rotating the winch 16 such that the distal end 42 of the middle line 36 is a selected distance between the winch 16 and the guides 46, 48. Because there is tension on all three lines 32, 34 and 36, the boat 12 will be retained in the selected position by the tautness of the middle line 36 pulling the boat 12 toward the winch 16 and the tautness of the left and right lines 32, 34 pulling the boat 12 away from the winch 16 and towards the guides 46, 48. One skilled in the art will recognize the maximum distance that the boat 12 can be moved by the winch system 19 of the present invention is a distance between the guides 46, 48 and the winch 16.

In operation, the boat 12 is preferably on a body of water having a landing site (not shown) and a dock or pier (not shown) positioned nearby. The pilot preferably secures the boat 12 to the dock or pier (not shown) and transports himself/herself to the trailer 14 preferably attached to a vehicle (not shown) and backs the trailer 14 into the body of water at the landing site such that the taut lines 32, 34, 36 and the loop 44 as illustrated in FIGS. 1 and 6 will engage the clip 13 attached to the bow 11 of the boat 12. With the lines 32, 34, 36 and the loop 44 in a taut arrangement, the winch 16 is unlocked such that the winch 16 will freely rotate when force is applied to the lines 32, 34, 36 and the loop 44. With the trailer 14 secured in a selected position in the body of water, the pilot transports himself/herself back to the dock or pier and detaches the boat 12 from the dock or pier such that boat 12 can be maneuvered through the water onto the trailer 14.

The pilot aligns the boat 12 with the taut loop 44 that connects the lines 32, 34, 36, and by driving the boat over the trailer forces the spring biased clip 13 into the loop 44 such that the clip 13 engages loop 44, thereby attaching the boat 12 to the winch 16. The pilot propels the boat 12 onto the trailer 14 causing the winch 16 to rotate wherein the left and right lines 32, 34 uncoil from the reel 19, and the middle line 36 coils about the reel 19 as best illustrated in FIGS. 7 and 8. Preferably, the bow 11 of the boat 12 is forced sufficiently near the winch 16 such that the pilot can walk to the bow 11 of the boat 12, grip the handle 17 on the winch 16, and turn the reel 19 to move the boat to its most forward position for securing the boat 12 to the trailer 14. The pilot then climbs out of the boat 12 and onto the trailer 14 and walks on the trailer 14 onto the shore having secured the boat 12 to the trailer 14 without ever getting wet. The pilot then drives the vehicle (not shown) away from the landing site with the boat 12 properly aligned on the trailer 14 in tow.

The winch system 10 of the present invention has significant advantages over the previous methods and apparatuses for securing a boat 12 to a trailer 14. One advantage is the fact that a single person can align and secure the boat 12 onto the trailer 14 without the need of another person. The prior method of having an eyelet (not shown) attached on the bow which is secured to a clip extending from a line coiled about a winch, causes significant issues for one person including maintaining control of the boat 12 and having to enter into the water to secure the boat 12 to the eyelet (not shown). Additionally, when wind and waves apply forces to the boat 12, it is difficult to align the boat 12 on the trailer 14. If the boat 12 is misaligned on the trailer 14, the boat 12 may become damaged or may have to be realigned on the trailer 14 to be able to travel on the road. The present invention provides an apparatus and method for one person to align and secure the boat 12 onto the trailer 14 without having to get wet or leave the boat 12 when securing the boat with the winch 16.

The present invention is also in the form of a kit. The kit includes a winch and two guides for mounting onto the boat trailer. The two guides are mounted onto the boat trailer rearward of the mounted winch and are spaced from each. The kit further includes first, second and third line sections with the first and second line sections for winding onto the reel of the winch in a first rotational direction and a third line section for winding onto the reel of the winch in a second rotational direction opposite from the first rotational direction. All three lines are connected to each other at distal ends thereof.

Alternatively, referring to FIG. 9, the winch system 100 of the present invention may be useful to move anything linearly a distance D between the left and right guides 114, 116, respectively, and the winch 102. The winch system 100 has a similar configuration to the winch system 10 as previously described and includes a plurality of partitioned compartments having a left compartment 104, a right compartment 106 and a middle compartment 108 separated by left and right partitions 110 and 112. The winch 102 is mounted to a stable structure which also supports the left and right guides 114 and 116, respectively. Left and right lines 118, 120 are coiled about a reel of the winch and the left compartment 104 and the right compartment 106, respectively, in a first rotational direction. A middle line 122 is coiled about the middle compartment 108 of the winch in a second rotational direction, opposite the first rotational direction. The left and right lines 118, 120 are guided by the left and right guides 114, 116, preferably rotatable pulleys, toward the middle line 122 such that distal ends 124, 126 and 128 of the left line 118, the right line 120, and the middle line 122 are joined together where each of the lines are in tension.

Preferably, an engaging portion 130 is secured between the left line 118 and the right line 120. One skilled in the art will recognize that the winch device 100 of the present invention is useful to laterally move any object secured to the engaging portion 130 a distance D defined by the distance between the left and right guides 114, 116 and the winch 102.

Figure 10:
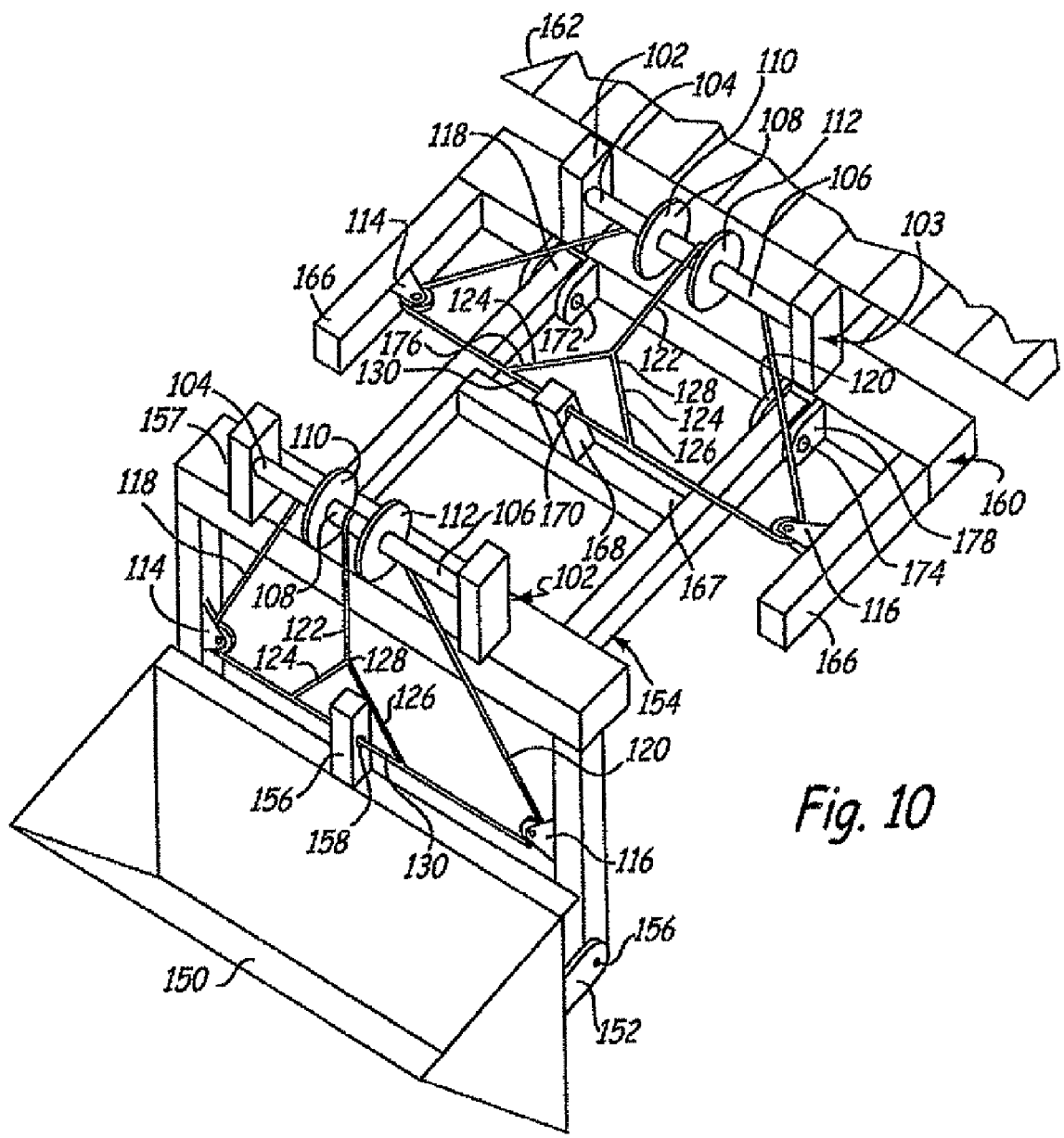
FIG. 10 is a perspective view of a front end loader that is positionable with two winch systems of the present invention.

Referring to FIG. 10, the winch system 100 of the present invention can be employed to both adjust a vertical position of a loader bucket 150 and also to adjust a rotational position of the loader bucket 150. Like elements in FIG. 10 will be referred to using like reference characters that were used in FIG. 9 for like elements.

The loader bucket 150 includes brackets on a left side and a right side of the bucket, one of which is shown at 152. The loader bucket 150 is pivotally attached to a lifting frame 154 with a pivot pin 156 such that the loader bucket 150 pivots with respect to the lifting frame 154. The loader bucket also includes an engaging arm 156 extending from the loader bucket 150 and having a through bore 158.

A front winch 102 is attached to a horizontal member 156 of the lifting frame 154 proximate the loader bucket 150 wherein the front winch 102 includes the left compartment 104, the right compartment 106 and the middle compartment 108 separated by left and right partitions 110 and 112 wherein a left line 118 and a right line 120 are wound in a first rotational direction within the left and right compartments 104 and 106, respectively. The left and right lines 118, 120 are guided by left and right guides 114 and 116, preferably rotating pulleys, that are mounted to the lifting frame 154.

Distal ends 124, 126 and 128 of the left line 118, the right line 120 and the middle line 122, respectively, are joined together such that each of the lines is taut with respect to each other. An engaging portion 130 is positioned through the through bore 158 and secures left and right lines 118, 120 toward each other.

In operation, the winch 102, preferably an electric winch, is rotated in a first direction pulling or laterally moving the engaging arm 156 towards the winch 102. As the engaging arm 156 is laterally moved towards the winch 102, the middle line 122 shortens in length and the left and right lines 118, 120 lengthen thereby exerting a force upon the engaging arm 156 with the engaging portion 130. The force on the engaging arm 156 causes the engaging arm 156 to laterally move, which in turn causes the loader bucket 150 to tilt or rotate about the pivot pin 156, such that the rotational position of a loader bucket 150 can be manipulated into a selected position. One skilled in the art will recognize that the tilt of the loader bucket 150 is limited by the distance from the guides 114, 116 to the winch 102.

A second back winch 103 is secured to a rigid frame 160 secured to a vehicle 162 wherein the rigid frame 160 does not move with respect to the vehicle 162. A second back winch 103, having the same configuration as the first front winch 102 is described using the same reference characters used to described the winch 102. The winch 103 is used to adjust the vertical position of the moving frame 154 and the loader bucket 150.

The rigid frame 160 includes left and right extensions 164 and 166 that extend toward the loader bucket 150 and have left and right guides 114 and 116 secured thereto. The moveable frame 154 also includes a second cross member 167 having an engaging arm 168 extending from the horizontal member 167 and having a through bore 170. The engaging portion 130 is positioned through the through bore 170 and connects the left and right lines 116, 118 to each other. Distal ends 124, 126, 128 of the left line 118, the right line 120 and the middle line 122, respectively, are joined together such that each of the lines are taut with respect to each other. The winding of the left, right and middle lines 118, 120 and 122 on the winch 103 is the same as previously described with reference to the winch 102.

Ends of the moveable frame 154 are pivotally attached to the rigid frame 160 with pivot pins 172, 174 extending through brackets 176 and 178 attached to the rigid frame 160 wherein the pivot pins 172, 174 extend through apertures (not shown) in the moving frame 154 such that the moving frame 154 pivots with respect to the rigid frame 160.

In operation, the operator can manipulate the second back winch 103 to raise or lower the loader bucket 150 by manipulating a lateral position of the engaging arm 168 toward and away from the winch 103 attached to the rigid frame 160. As the engaging arm 168 is moved, the moveable frame 154 pivots about the pivot pin 172, 174, thereby raising and lowering the loader bucket 150.

Similarly, the tilt or rotational position of the loader bucket 150 can be adjusted by manipulating the first front winch 102 located proximate the loader bucket 150 by coiling and uncoiling the lines 118, 120 and 122 to adjust a lateral position of the engaging arm 156 relative to the winch 102. As the engaging arm 156 is laterally moved, the loader bucket 150 pivots about the pivot pin 156 to adjust a tilt of the loader bucket 150.

One skilled in the art will recognize that the winch system 100 of the present invention allows a loader bucket to be attached to an ATV or other vehicle. The ATV or other vehicle does not require an expensive hydraulic system to provide the same positioning capabilities, rather the loader bucket is powered by an electric system already existing on the vehicle.

Figure 11:
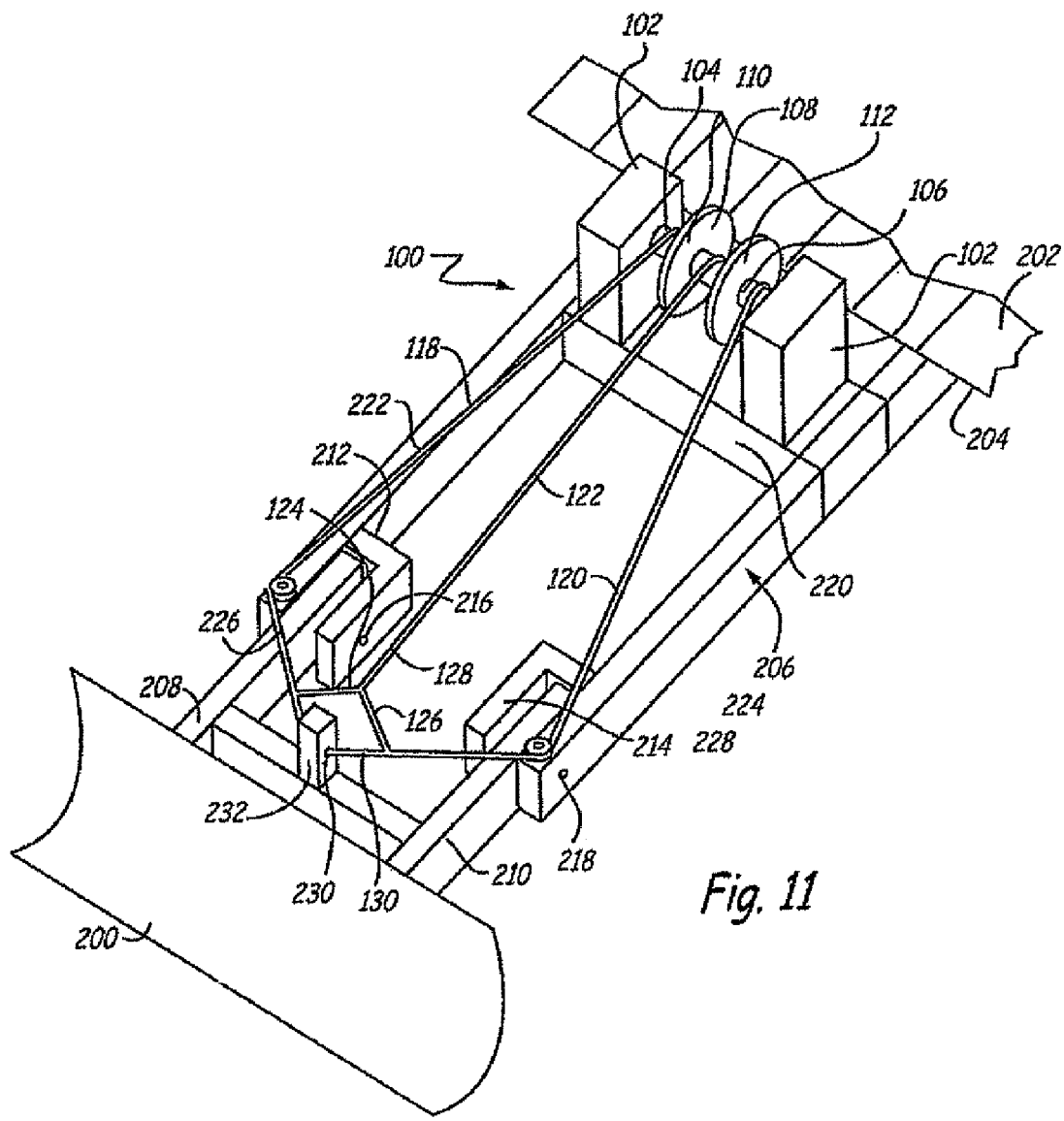
FIG. 11 is a perspective view of a scraping blade with the winch system of the present invention used to adjust a height of the blade.

Referring to FIG. 11, the winch system 100 of the present invention can also be employed to adjust a vertical position of a scraper blade 200 that is preferably attached to an ATV or a vehicle 202 with a rigid frame 206 extending from the front 204 of the vehicle 202. The scraper blade 200 includes left and right extensions 208 and 210 extending towards the vehicle 202 that engage left and right brackets 212 and 214, respectively. Pivot pins 216 and 218 pivotally attach the left and right extensions 208 and 210 to the rigid frame 206.

The winch system 100 is attached to a cross member 220 proximate the front end 204 of the vehicle 202. Left and right lines 118, 120 are coiled in a first rotational direction about left and right compartments 104, 106 of the winch 102, preferably an electric winch. A middle line 122 is coiled in an opposite rotational direction about a middle compartment 108 of the winch 102.

The left and right lines 118, 120 are guided by left and right guides 226, 228 attached to left and right extensions 222 and 224, all respectively, of the rigid frame 206. The left and right guides 226, 228 guide the left and right lines 118, 120 such that the distal end 124, 126, 128 of the left line 118, right line 120 and middle line 122 are attached such that each of the lines is taut with respect to each other. An engaging portion 130, attaching the left and right lines 118, 120, is positioned through a through bore 230 within an engaging arm 232 attached to the scraper blade 200.

In operation, the winch 12 is rotated in a first direction to draw the engaging arm 232 towards the winch 102 or the winch 102 is rotated in a second direction to force the engaging arm 232 away from the winch 102. As the engaging arm 232 laterally moves, the scraper blade 200 pivots about the pivot pins 216, 218 thereby adjusting a height of the scraper blade 200.

Figure 12:
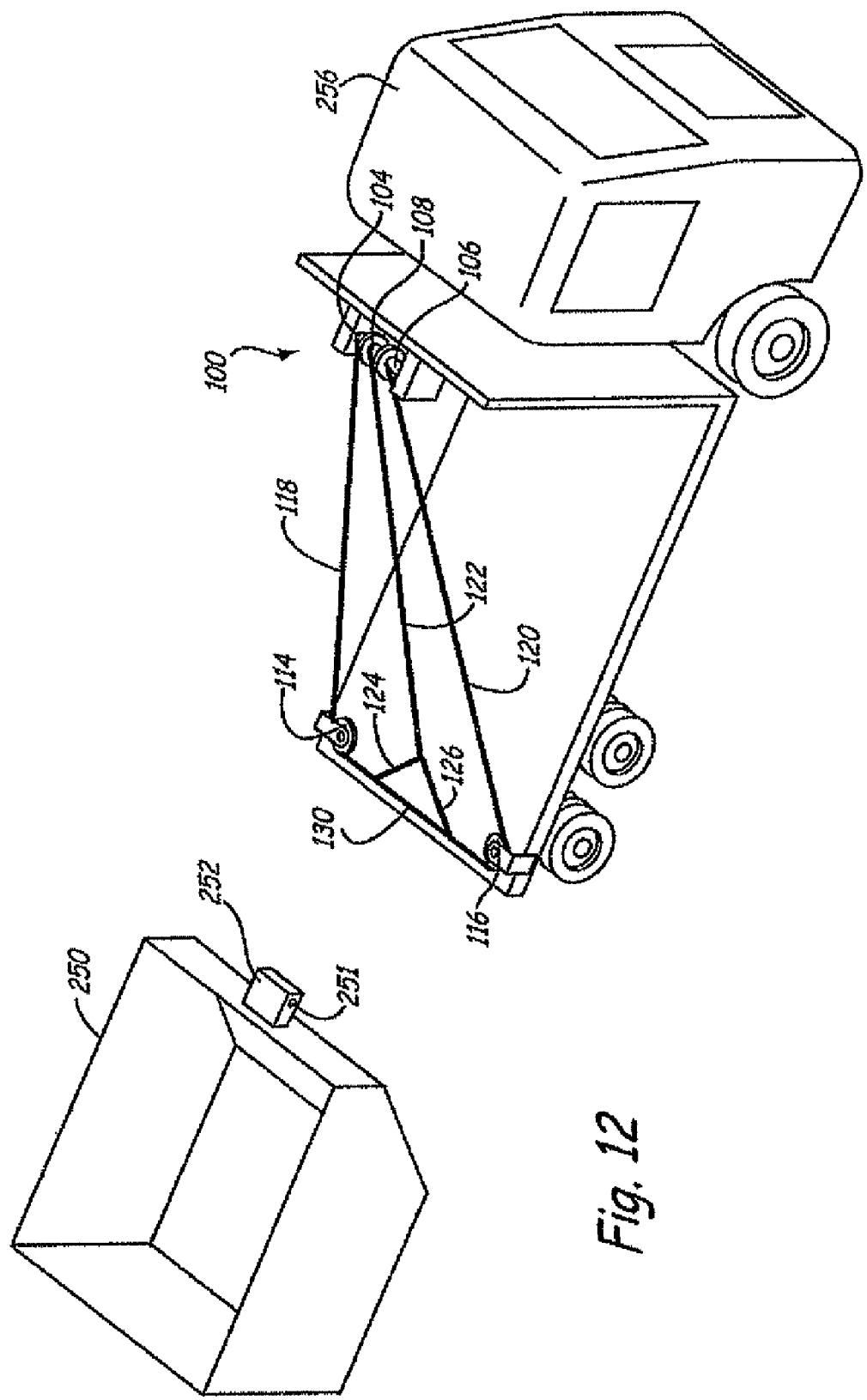
FIG. 12 is a perspective view of the winch system of the present invention used to load a dumpster onto a flat bed truck.

Referring to FIG. 12, the winch system of the present invention can also be employed to laterally move any object including a dumpster 250. An engaging arm 252, having a through bore 251, extends from the dumpster 250. The engaging portion 130 of the winch system 100 is positioned through the through bore 251 to connect the winch 102 to the dumpster 250.

The winch 12 is attached to a flat bed truck 256 wherein the winch 102 is preferably electrically powered. The winch 102 includes a left compartment 104, a right compartment 106 and a middle compartment 108, and has a left line 118, a right line 120 coiled about the winch in the left and right compartments 104, 106, respectively, in a first rotational direction. The left and right lines are guided by left and right guides 114, 116 which are secured to the flat bed truck 256 and preferably include rotatable pulleys. Distal ends 124, 126 of the left and right lines 118, 120 are secured to a distal end 128 of a middle line 122 that is wound in a second rotational direction into the middle compartment 108 of the winch 12 in a rotational direction opposite the first rotational direction.

With the dumpster 250 secured to the winch system 100, the operator can operate the winch 102 to laterally move the dumpster 250 onto the flat bed truck 256. The winch system 100 can also be used to push the dumpster 250 off of the flat bed truck 256 by reversing the rotation of the winch 102 as previously described. One skilled in the art will recognize that the winch system 100 of the present invention is able to laterally move the dumpster 250 a distance from the left or right guides 114, 116 to the winch 102 and can secure the dumpster in any position therebetween.

Although the winch system 100 of the present invention has been illustrated in manipulating a loader bucket in FIG. 10, a scraper blade in FIG. 11 and a dumpster in FIG. 12, one skilled in the art will recognize that the winch system 100 of the present invention can be used to laterally move any object that is secured to the lines and is securely positionable between any lateral position between the left and right guides 114, 116 and the winch 102. Further, if the object is being laterally moved and is rotatably connected to another object, the lateral motion of the object can be translated into a rotational or pivotal movement about a pivot point.

Although the present invention has been described with reference to preferred embodiments, workers skilled in the art will recognize that changes may be made in form and detail without departing from the spirit and scope of the invention.

What is claimed is:

1. A method for laterally moving an object, the method comprising:
   positioning a boat trailer having a winch wherein the winch comprises at least three spaces for winding a line thereon, the three spaces comprising a left space, a middle space and right space, and wherein the boat trailer includes a first and a second guide, each guide positioned a selected distance from the winch and wherein the line comprises three line segments, each having a proximal end, each proximal end being windable in one of the three spaces, and the three line segments being joined at distal ends at a position between the first and second guides;
   positioning a boat towards the joined distal ends of the three line segments;
   attaching the boat to the line proximate the juncture of the three line segments; and
   operating the winch to wind one of the line segments about the winch thereby drawing the boat onto the boat trailer.

* * * * *